(12) United States Patent
Henry et al.

(10) Patent No.: US 6,845,306 B2
(45) Date of Patent: Jan. 18, 2005

(54) SYSTEM AND METHOD FOR PERFORMANCE MONITORING OF OPERATIONAL EQUIPMENT USED WITH MACHINES

(75) Inventors: Kenneth W. Henry, Mesa, AZ (US); James A. Rhoden, Phoenix, AZ (US); Todd Michael Inskeep, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/053,183

(22) Filed: Nov. 9, 2001

(65) Prior Publication Data

US 2003/0187554 A1 Oct. 2, 2003

Related U.S. Application Data

(60) Provisional application No. 60/247,440, filed on Nov. 9, 2000.

(51) Int. Cl.⁷ .......................... G01M 17/00; G06F 19/00
(52) U.S. Cl. .............................. 701/29; 701/30; 701/31; 701/32; 701/33; 701/35
(58) Field of Search .............................. 701/29, 30, 31, 701/32, 33, 35

(56) References Cited

U.S. PATENT DOCUMENTS

| | | | |
|---|---|---|---|
| 4,967,337 A | | 10/1990 | English et al. |
| 5,033,010 A | * | 7/1991 | Lawrence et al. ............. 701/35 |
| 5,710,723 A | | 1/1998 | Hoth et al. |
| 5,842,157 A | | 11/1998 | Wehhofer et al. |
| 5,852,793 A | | 12/1998 | Board et al. |
| 5,864,781 A | | 1/1999 | White |
| 6,243,628 B1 | * | 6/2001 | Bliley et al. ................... 701/29 |
| 6,301,531 B1 | * | 10/2001 | Pierro et al. ................... 701/29 |
| 6,330,499 B1 | * | 12/2001 | Chou et al. .................... 701/33 |
| 6,363,332 B1 | * | 3/2002 | Rangarajan et al. ......... 702/185 |
| 6,445,985 B1 | * | 9/2002 | Bitzer et al. ................... 701/35 |
| 6,622,070 B1 | * | 9/2003 | Wacker et al. ................. 701/29 |
| 2001/0033225 A1 | * | 10/2001 | Razavi et al. ............. 340/425.5 |
| 2001/0037168 A1 | * | 11/2001 | Hozuka et al. ................ 701/29 |
| 2002/0002430 A1 | * | 1/2002 | Nada ............................ 701/35 |
| 2002/0143445 A1 | * | 10/2002 | Sinex ........................... 701/29 |
| 2002/0193933 A1 | * | 12/2002 | Adibhatla et al. ........... 701/100 |
| 2003/0093204 A1 | * | 5/2003 | Adachi et al. ................ 701/50 |
| 2003/0135310 A1 | * | 7/2003 | Bangert et al. ............... 701/29 |

* cited by examiner

*Primary Examiner*—Thomas G. Black
*Assistant Examiner*—Brian J. Broadhead
(74) *Attorney, Agent, or Firm*—Robert Desmond, Esq.

(57) ABSTRACT

A component trend monitoring system for monitoring the performance of components and comparing the performance with stored performance data to accurately trend and predict the failure of the components. The system includes computer chips attached to the various components, for receiving and storing historical and performance data about each component, and a processor for retrieving the stored data from the memory chips. The processor receives and analyzes the data against historical data for predicting failure based upon past trends within the historical data. The processor also provides a signal for impending failure of a given component.

16 Claims, 5 Drawing Sheets

SYSTEM AND METHOD FOR PERFORMANCE MONITORING OF OPERATIONAL EQUIPMENT USED WITH MACHINES

CROSS-REFERENCE TO RELATED APPLICATION

This application claims the benefit of U.S. Provisional Application Ser. No. 60/247,440 filed Nov. 9, 2000.

BACKGROUND OF THE INVENTION

The present invention relates to a method and apparatus for tracking relative to time the performance, reliability and condition of line replacement units used on aircraft and other types of machines.

Auxiliary power units (APU) for aircraft may generally be gas turbine engines used on aircraft to supply pneumatic power and/or shaft horsepower when the primary propulsion engines may not be operating. Typically, as illustrated in FIG. 1, the APU 10 may be mounted in the tailcone 12 of the aircraft, though on some airplanes such as the Boeing 727, the APU may be mounted in the wheel well.

Referring to FIG. 2, one form of an auxiliary power unit to which the present invention relates may generally be denoted by reference numeral 10. The APU 10 may include in flow series arrangement a compressor inlet 14, a compressor 16, a bleed port 18 for providing compressed air to the aircraft, a combustor 20 having a primary fuel nozzle 22 and a secondary fuel nozzle 24, a turbine 26 and a gas exhaust 28. The compressor 16 and the turbine 26 may be mounted for rotation on a shaft 30 that extends to and drives a gearbox 32. Mounted to the gearbox 32 may be accessory components such as an electric generator 34, a lube pump 36, a fuel control unit 38 and a start motor 40. When one of these components fails, it may be easily removed by detaching it from the gearbox 32 and replacing it with a new component that may be just as easily attached to the gearbox 32. In many instances, these components may be attached/detached without removing the APU from the aircraft. For some configurations in order to attach/detach these components, the APU may have to be removed from the aircraft. In these cases, however, the replacing of the components may occur on the tarmac adjacent the aircraft. In either scenario, the component may be replaced without removing the aircraft from operation. Accordingly, these components are referred to as Line Replaceable Units, (LRU), as they can be replaced without taking the aircraft out of operation or off line.

In operation, as the shaft 30 rotates, air may be inducted through the inlet 14 and pressurized in the compressor 16. Any required bleed air flows through bleed port 18 with the remaining air flowing into the combustor 20. In the combustor 20 the air may be mixed with fuel and ignited to form a hot pressurized gas. This gas expands across the turbine 26, causing the turbine 26, shaft 30, compressor 16 and gearbox 32 input to rotate which in turn drives the LRUs 34, 36, 38 and 40. The expanded gas then flows through the exhaust 28 and out into the surrounding environment. The operation of the APU 10 is controlled by an electronic control unit (ECU), not shown, that may be remotely located from the APU 10 in the aircraft.

The APU has a data memory module (DMM) that collects and stores APU operational and performance data as well as the serial number of the APU. This data may be used for tracking the APU health and operational conditions. Some life cycle calculations may be made by the ECU and stored in the DMM. Data is manually collected from the DMM when the aircraft may be taken off line and into a repair and overhaul facility.

For cost and performance reasons, the ability to track the performance, reliability and condition of these LRUs may be important. However, these types of components may be very difficult to track in the field. The LRUs may often be replaced, exchanged, or even discarded when thought to have failed.

Current systems use the data stored in the DMM to try to predict the failure of LRUs by evaluating performance trends (trending) of the APU as a whole. However, trending the LRUs as part of the APU has not been very successful, as current systems do not account for or know a units current configuration. That is they do not have a way to detect when an old LRU has been replaced with a new LRU. Current trending systems look at operational parameters to track particular performance trends looking for changes over time. Current systems fall short when an LRU may be replaced because the new LRU will affect the APU performance trend. Although the data in the DMM may show a change in APU performance, it may not be evident why the performance data has changed. Currently, there is no way for the current trending systems to know that an LRU has been changed. In addition, current systems do not use trend monitoring for the individual LRU components.

As can be seen, there is a need for a trending system and method that is able to determine the exact configuration of the APU as well as provide a method for each of the LRUs to be individually trended.

Although the foregoing description pertains to the use of this invention for APUs, similar application and benefits exist for LRUs associated with propulsion gas turbine engines and other machines.

SUMMARY OF THE INVENTION

The present invention comprises a method and apparatus for determining the configuration of an APU as well as for performing predictive trend monitoring on the APU and its LRUs.

In one aspect of the present invention a memory chip may be embedded in each LRU. The memory in the memory chip may be addressed by system electronics or any computer via a data bus. During the build of the LRU, data that describes the component by serial number, part number, as-built performance, and other pertinent data may be loaded in the smart chip. During operation the system may keep track of the LRU usage (hours and cycles) as well as compare its current performance to its as-built performance. As-built performance being the performance of a new or refurbished LRU.

In another aspect, the present invention may also support monitoring software that will track and compare the LRU usage and performance to determine when it has failed or is about to fail. This process is called trend monitoring. In this case it may be considered a smart trend monitoring as not only may the performance of the individual components be trended against themselves, but also they may be trended to determine how well they are operating in the system. The information may be transmitted to a collection station or stored in the system for later retrieval. Knowing how the LRU is operating compared to its as-built performance may allow the trending software to alert the operator of a pending failure prior to actual failure.

In yet another aspect, the present invention may also reduce the chance for an unscheduled replacement that may also reduce the number of delays, thus reducing operational cost. Also, the embedded chip may collect usage hours and cycle data of the LRU that may be used to schedule repairs and for warranty purposes.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
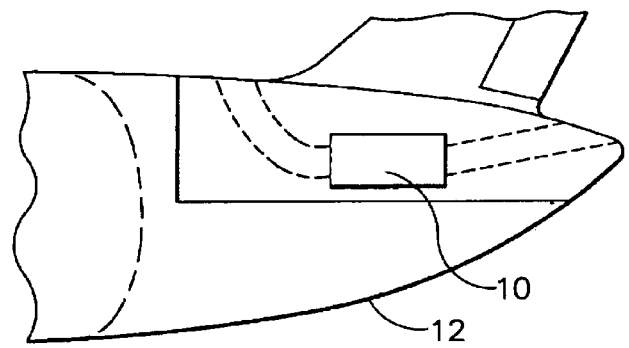
FIG. 1 is an illustration of an auxiliary power unit mounted in an aircraft.
Figure 2:
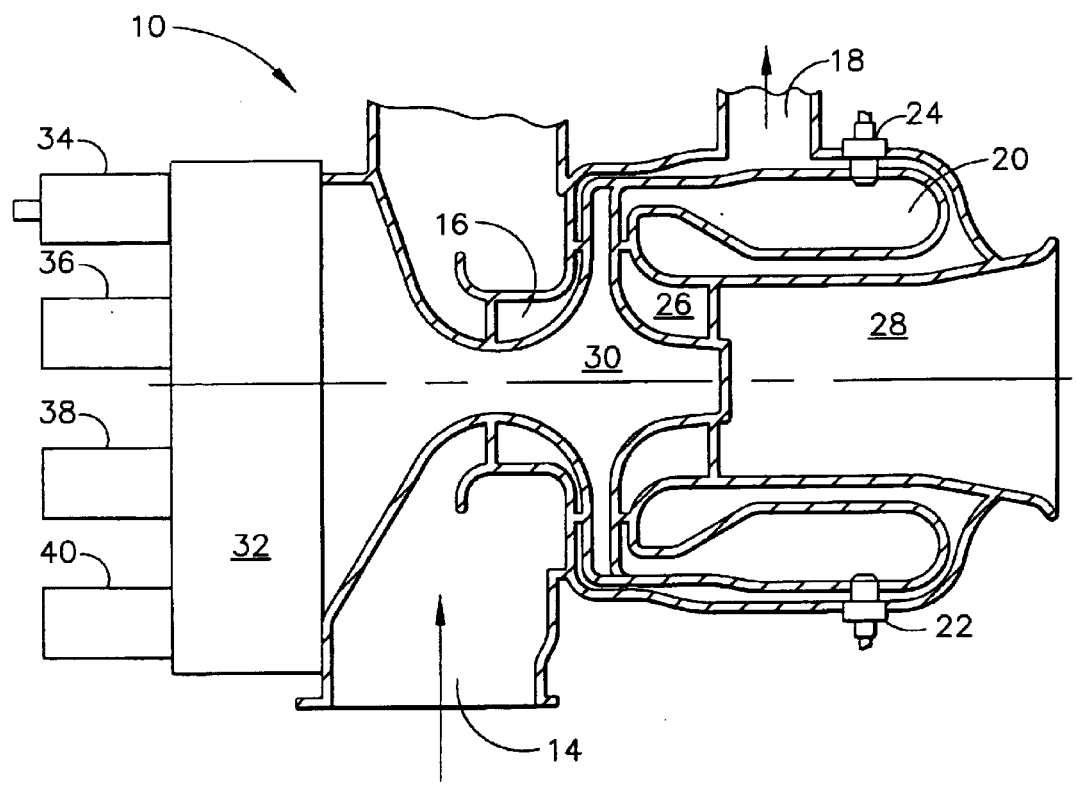
FIG. 2 is a schematic cross-section of an exemplary gas turbine auxiliary power unit.

Although a large number of machines may benefit from use of the invention, for purposes of illustration, the invention may be described as it may be implemented for an APU of an aircraft as shown in FIG. 2.

Figure 3:
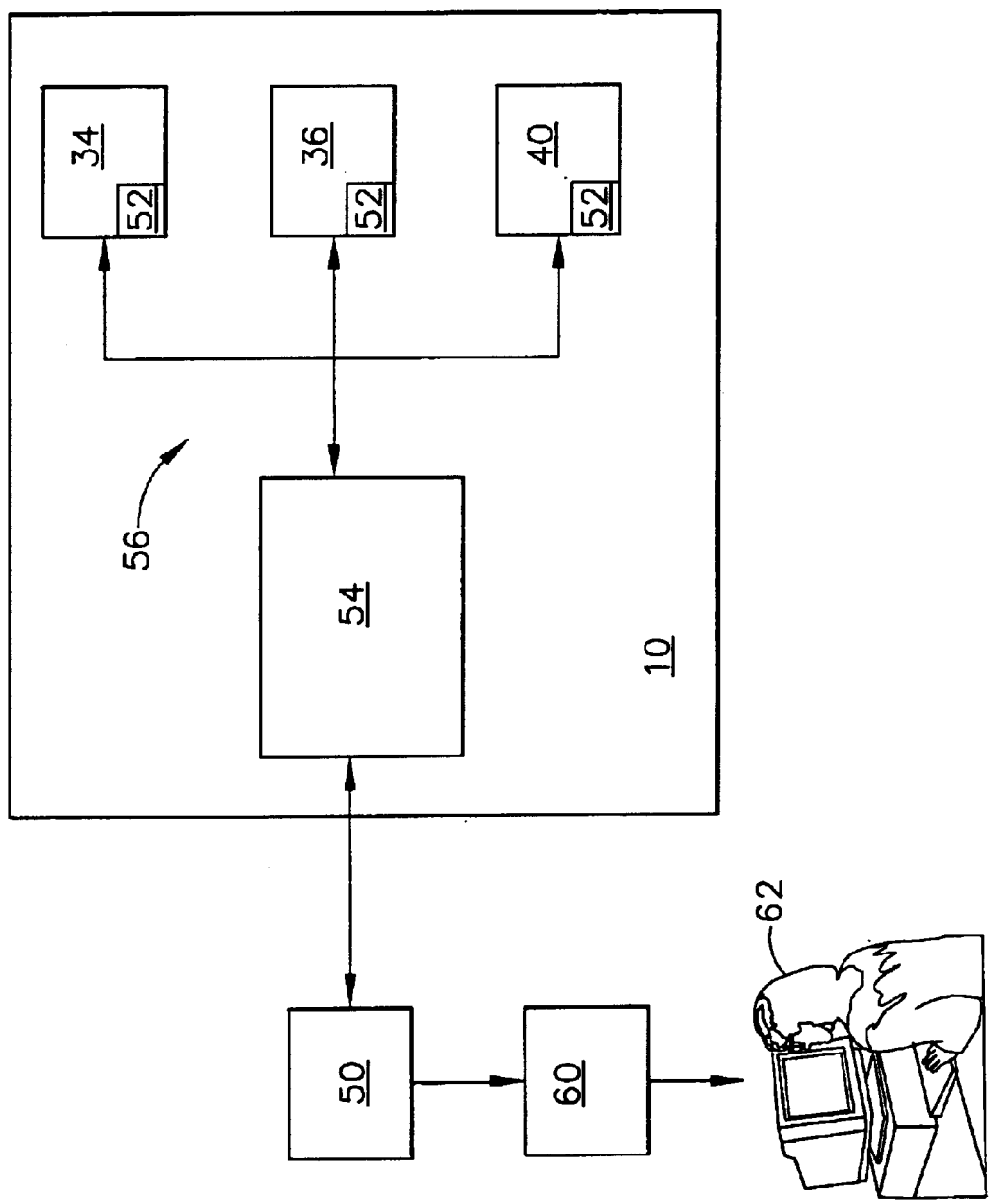
FIG. 3 is a schematic block diagram indicating the relational links between components of the system.

The operational sequence for monitoring the LRUs may be described in conjunction with FIGS. 2 and 3. When the operator of an aircraft wants to start the APU 10, a start command may be sent from the cockpit to the APU's electronic control unit (ECU) 50. The ECU 50 runs a diagnostics sequence checking itself and all of the LRUs 34, 36, 38, and 40 for static feedback just to assure there are no opens/shorts in the equipment. After the diagnostic check, the ECU 50 in turn sends signals to the starter motor 40 and fuel control unit 38 to initiate a start of the APU 10. Mounted on each of the LRUs may be a computer chip 52 that communicates with a smart data memory module (SDMM) 54 that may be mounted in the APU 10. The SDMM 54 may communicate with each of the chips 52 through a data bus 56.

When the ECU 50 applies power to the SDMM 54 it may perform the same function as the DMM mentioned in the background section of this application. In addition, the SDMM 54 may also communicate with and read the memory of all of the chips 52 located with the LRUs 34, 36, 40. These chips 52 may be located with any component where there may be a need to track usage or where there may be a desire to know when a component has failed or is about to fail. The present invention may be used in any system that uses components to control operation.

There may be two kinds of data stored on each chip 52. The first kind of data may be data stored when the LRU is built, as-built data, which may include the part number, serial number, as built performance map (a number of performance points recorded during acceptance test), the build location, whether the part is a new or repaired part, the type of repair (if it is a repaired part), and any other data as determined necessary. The chip 52 may be programmed when the LRU is built or returned to the factory for repair. The programming may be done automatically when the Acceptance Test is run on the LRU, just before shipment. Acceptance Test may be the test run on a production LRU to assure that it will meet a specified level of performance before it leaves the factory. If the LRU fails the test, it may not be shipped.

The second kind of data that may be stored in each chip 52 may be from the SDMM 54 as data acquired during operation. The SDMM 54 may store data in each LRU's chip 52 during the power down sequence which data may include the hours accumulated, the number of starts accumulated, and the Built-in-Test (BITE) record. The BITE record may be a record of the results of the ECU's 50 Built-In-Test or BITE procedures. For example, when the ECU 50 may perform a BITE test it may determine that one of the LRUs had a short. The BITE record may then be transmitted to the SDMM 54 for it to be stored in the LRU's chip 52. BITE fault date and time may also be stored. The chip 52 may also store other performance data as determined during the power down sequence or other operations. The SDMM 54 may read all chips 52. Each of the chips 52 may be able to store at least 2 k bytes of data.

Figure 4:
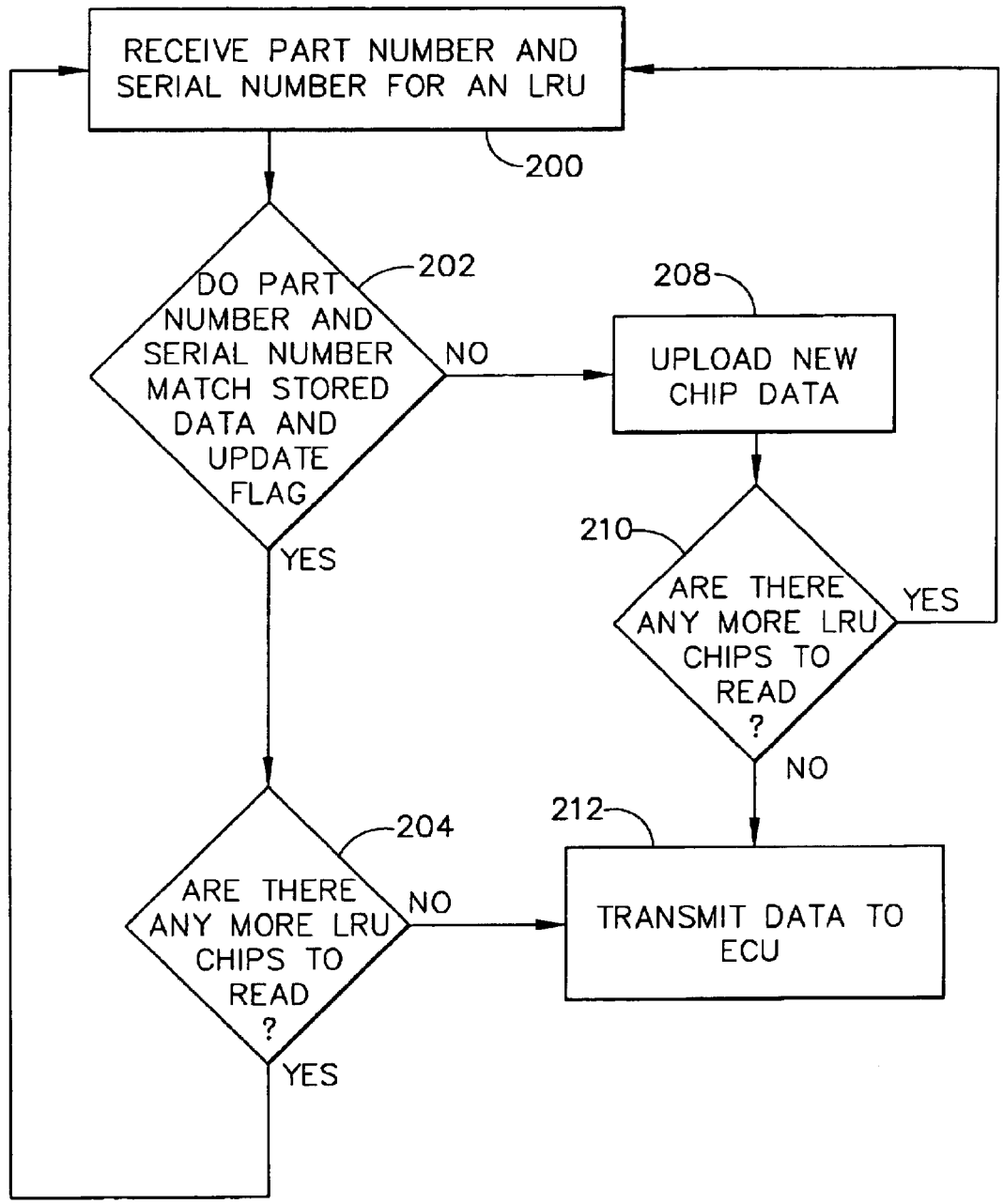
FIG. 4 is a logical decision flow diagram of the SDMM and LRU protocol.

Referring to FIG. 4, the logical flow for the SDMM 54 of the present invention as it communicates with the chips 52 located with the LRUs may be as follows. In step 200, the SDMM 54 may be programmed to look at the first two memory locations (not shown) where the part number and serial number for the LRU may be stored. In step 202, the system may determine if this is a new LRU by comparing the part number and serial number with the previously stored data. The system may then determine if there are more LRU chips to read, at step 204. If there are more LRU chips to read the system may proceed to read the next LRU chip. In the event that the system determines that the part number and serial number do not match with the previously stored data, the system may determine it is a new part and may upload all of the data stored in the chip at step 208. Once again the system may query if there are more LRU chips to read, step 210, and if so the system may proceed to read the next LRU chip. Once the SDMM 54 reads all of the LRU chips 52, following the sequence above, the SDMM 54 may transmit the data to the ECU 50 at step 212.

The ECU 50 may now know the serial number of the APU 10 and all of its LRUs 34, 36, 38, 40. During APU operation, the APU 10 and each of the LRUs actual performance may be compared to their as built performance. The trending system may now trend the APU performance and the performance of each LRU over time and is smart enough to know if a part has been changed.

A smart trend monitoring approach may be used to determine if an LRU is about to fail by trending its current performance to its as built new performance.

A smart trend monitor system may have the ability to send an alarm or warning message to the operator to change the part, say at the next airplane non-flight period. Therefore, based upon the trend monitoring, the system may automatically notify the operators that a failure may be approaching.

Other benefits of the present invention may be that the chips 52 may contain all of the as built data as well as all the performance data for LRU operation in the field to provide a history of operation and failure. One of the biggest problems with monitoring LRUs is that there is no operational history (hours, cycles, fault record etc.) when they are returned to the shop for repair. Users may not know why the part was returned or the number of hours or cycles on the part. Typically, warranties on these parts are based on hours or cycles. Many of the parts may be tested upon return and found to be operational. Industry calls this event, No Fault Found (NFF). This may be because a parts performance, much of the time, may depend on the performance of other parts in the same system. The fuel system for example, has a fuel control, shut off valve, flow divider, atomizers, etc. A smart trend monitoring system may trend the parts as a system and trend each part against its as built new performance.

Referring back to FIG. 3, the data stored on the SDMM 54 may be sent by the ECU 50 to an aircraft communication addressing reporting system (ACARS) 60. The ACARS 60 may transmit the data to maintenance personnel 62 at remote location. The maintenance personnel 62 may be able to utilize the trend monitoring data of the present invention to conduct real-time troubleshooting produce accurate LRU reports, and accurate estimations of spare parts needed.

Figure 5:
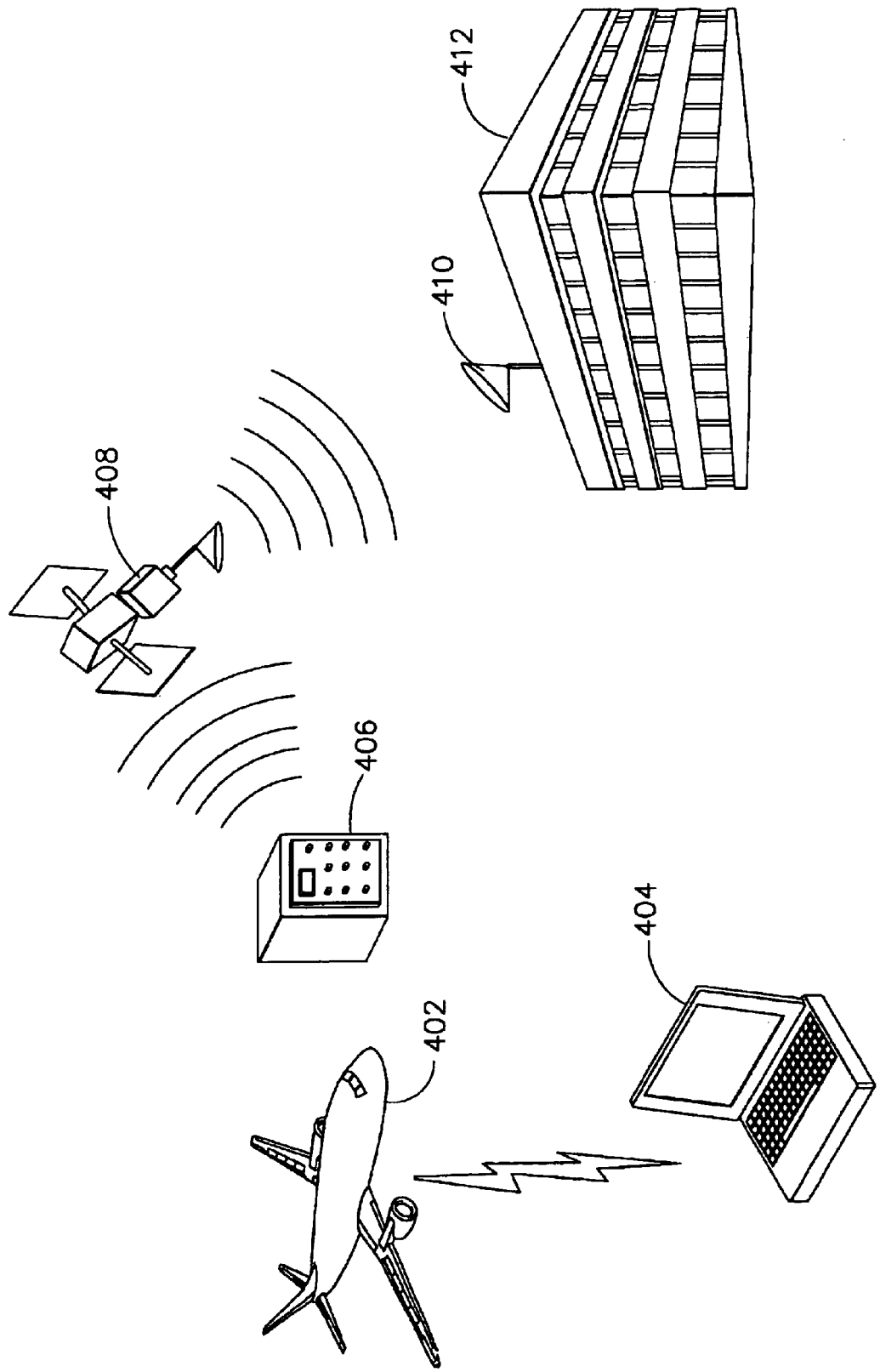
FIG. 5 is a schematic diagram of transmission and use of data from the performance monitoring equipment.
Figure 6:
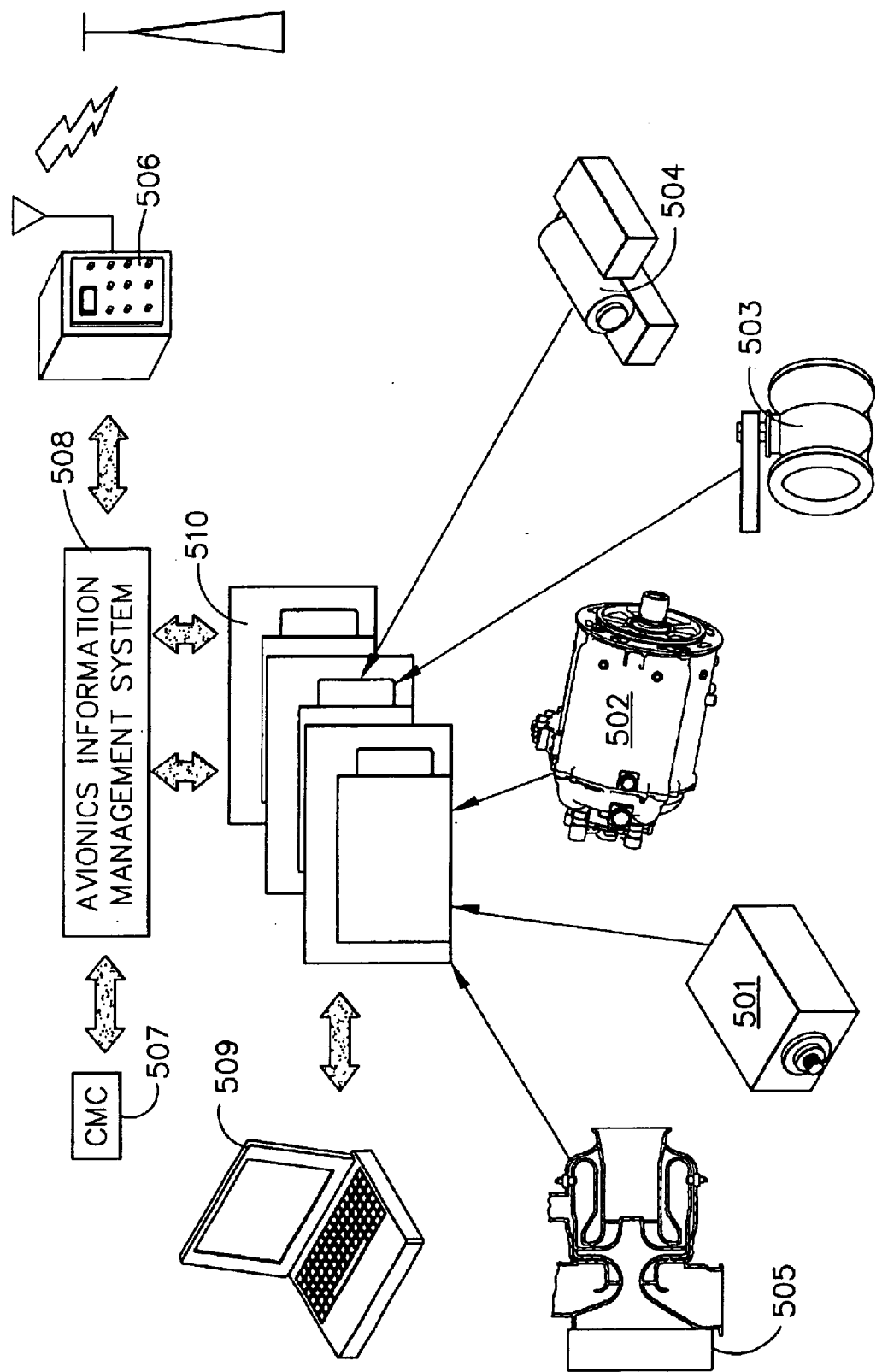
FIG. 6 is a schematic diagram of the elements of the data monitoring and reporting system.

Referring to FIGS. 5 and 6, the present invention may be employed on an aircraft 402. The system may retrieve and store data based upon performance and use during a given time period. The time period may be a portion of a flight, a flight, a series of flights, or on-ground testing. The data from the system of the present invention may be retrieved by communicating, including wireless communication, with another computer for downloading the stored data. An engineer or maintenance technician at a flight line maintenance location 404 may retrieve the data for evaluation and transmission to ground station 412. The trend monitoring data may also be transmitted using other systems such as the aircraft communication addressing reporting system (ACARS) 406. The ACARS 406 may transmit data to a satellite 408 that in turns transmits the data to a fleet maintenance ground station 412 via antenna 410 for use by personnel to assess the data.

The present invention may help to predict failures, improve dispatch reliability, provide a quick response and improve the ability to plan for the storing of parts. The present system may also improve and optimize spare parts provisioning.

The usage and trend data updated by the ECU on the aircraft may compare data during and after operation. The present invention may allow for a programmed replacement of parts prior to failure and improved spares provisioning. The trend monitoring of the present invention may minimize false alarms and replacement of LRUs before necessary.

Elements of the system may also be used with an avionics information management system 508 which may be in communication with a central maintenance computer (CMC) 507 and ACARS 506 that communicates with a ground station. Non-volatile memory modules 510 may be embedded in high value LRUs 501, 502, 503, 504 with information monitored and transmitted to utility controllers where data may be collected and updated for readable data at repair/ATP time. Usage and trend data may be updated by electronic controllers onboard an aircraft and compared during operational use. The data may be used to schedule repair, for spares provisioning, and for trend monitoring to facilitate operating cost reduction. Small hand held computers 509 may also be used at ground stations for data collection from controllers.

The high value LRU's 501, 502, 503, 504 monitored may be actuator valves, electronic elements, APUs associated with engines 505 and other aircraft system elements. The data monitored may include part number, serial number and usage data, such as, operating hours, cycles/starts and performance data. The data monitored may allow for programmed replacement of parts prior to failure and for spares provisioning. Approximate trend analysis may allow for minimization of false alarm and nonfailed parts replacement. Analysis may include statistical based diagnostic evaluation and performance data used to define control limits. Events beyond limits for LRUs may be flagged for investigation and for improved maintenance planning.

It should be understood, of course, that the foregoing relates to preferred embodiments of the invention and that modifications may be made without departing from the spirit and scope of the invention as set forth in the following claims.

We claim:

1. A system for monitoring performance, reliability and condition of a line replaceable unit used with machines comprising:

a computer chin positioned with said line replaceable unit and in communication with a smart data memory module, said computer chip storing as built data for said line replaceable unit, said as built data including identification data; and said smart data memory module in communication with an electronic control unit, said smart data memory module receiving the as built data, including the identification data, from the computer chip, said received identification data compared to previously received data to determine if the line replaceable unit has been replaced, said as built data used to determine an operational state of the line replaceable unit and wherein said identification data includes a serial number and a part number.

2. The system as in claim 1 wherein said computer chip receives and stores a set of operational data from sensors of said line replaceable unit.

3. A system for monitoring performance, reliability and condition of a line replaceable unit used with machines comprising:

a computer chip positioned with said line replaceable unit and in communication with a smart data memory module, said computer chip storing as built data for said line replaceable unit, said as built data including identification data; and said smart data memory module in communication with an electronic control unit, said smart data memory module receiving the as built data, including the identification data, from the computer chip, said received identification data compared to previously received data to determine if the line replaceable unit has been replaced, said as built data used to determine an operational state of the line replaceable unit and wherein said as built data further includes performance unit characteristics, a place of manufacture, a new and repair status, and a type of repair.

4. A system for monitoring performance, reliability and condition of a line replaceable unit used with machines comprising:

a computer chip positioned with said line replaceable unit and in communication with a smart data memory module, said computer chip storing as built data for said line replaceable unit, said as built data including identification data; and said smart data memory module in communication with an electronic control unit, said smart data memory module receiving the as built data, including the identification data, from the computer chip, said received identification data compared to previously received data to determine if the line replaceable unit has been replaced, said as built data used to determine an operational state of the line replaceable unit and wherein said smart data memory module receives and stores a plurality of sets of operational data transmitted from said line replaceable unit, and wherein the plurality of sets of operational data are compared to the as built data to determine the operational state of the line replaceable unit.

5. The system as in claim 4 wherein the electronic control unit is in communication with a performance monitoring system.

6. The system as in claim 5 wherein the performance monitoring system comprises an aircraft in communication with an address reporting system and a trend monitoring system.

7. The system as in claim 4 wherein said plurality of sets of operational data comprises an hours accumulated, a number of starts accumulated and a built in test results that have occurred during specified time periods wherein each data set is identified as to time of occurrence.

8. A system for monitoring performance, reliability and condition of apparatus used with machines comprising:

a computer chip positioned with a line replaceable unit and in communication with a smart data memory module, wherein said computer chip receives and stores a set of as built data for said line replaceable unit, and wherein said set of as built data comprises a part number, a serial number, a unit performance characteristics, a place of manufacture, a new and repair status, and a type of repair; and said smart data memory module positioned with a machine operating with said line replaceable unit and in communication with an electronic control unit.

9. The system as in claim 8 wherein said set of as built data is received by said smart data memory module.

10. The system as in claim 8 wherein said set of as built data is compared to operational data to determine a performance of said line replaceable unit.

11. A system for monitoring performance, reliability and condition of apparatus used with machines comprising:

a computer chip positioned with a line replaceable unit for receiving and storing a set of as built data for said line replaceable unit, wherein said set of as built data comprises place of manufacture, and for receiving and storing a set of operational data from sensors of said line replaceable unit;

a smart data memory module positioned with a machine operating with a plurality of line replaceable units and in communication with said computer chip of each line replaceable unit wherein said smart data memory module receives and stores a set of as built data associated with each line replaceable unit and receives and stores a plurality of sets of operational data transmitted from each line replaceable unit;

an electronic control unit in communication with said smart data memory module; and a smart trend monitor element operating in said electronic control unit wherein said set of as built data and said sets of operational data are compared to determine the operational state of each line replaceable unit.

12. The system as in claim 11 wherein said set of as built data further comprises part number, serial number, unit performance characteristics, new and repair status, and type of repair.

13. The system as in claim 11 wherein said sets of operational data comprises hours accumulated, number of starts accumulated and built in test results that have occurred during specified time periods wherein each data set is identified as to time of occurrence.

14. A method for determining maintenance requirements for an apparatus operating with machinery, comprising the steps of:

locating a computer chip with a line replaceable unit and providing communication with a smart data memory module:

storing as built data in the computer chip;

monitoring and storing operational data from said line replaceable unit in the computer chip;

placing an electronic control unit in communication with said smart data memory module;

communicating with said computer chip to determine the part number and serial number thereof;

comparing the received part number and the serial number with the data stored in the smart data memory module;

retrieving and storing the as built data in said line replaceable unit if the part number and the serial number do not match;

retrieving and storing the operational data of said line replaceable unit in said smart data memory module;

presenting the as built data and the operational data to a smart trend monitor element; and comparing the as built data and the operational data in said smart trend monitoring element to determine the operational state of said line replaceable unit.

15. The method as in claim 14 further comprising the step of:

communicating the results of the comparison of the as built data and the operational data to a performance monitoring system.

16. The method as in claim 14 further comprising the steps of:

determining if said line replaceable unit is pending failure; and generating a signal for a pending failure.

* * * * *